United States Patent Office 3,432,319
Patented Mar. 11, 1969

3,432,319
WAX EMULSIONS STABILIZED WITH A METHYL CELLULOSE ETHER
Eugene A. Jakaitis, Syosset, Francis W. Littler, Mineola, and Emilio A. Roblendano, New York, N.Y., assignors to Mobil Oil Corporation, a corporation of New York
No Drawing. Filed Oct. 10, 1966, Ser. No. 585,316
U.S. Cl. 106—170   5 Claims
Int. Cl. C09g 1/04

ABSTRACT OF THE DISCLOSURE

Oil-in-water emulsions are provided comprising a paraffin wax, having a melting point within the range from about 100° F. to about 150° F., in an amount from about 5 to about 65 percent, by weight, and a methyl cellulose ether in an amount from about 0.2 to about 0.75 percent, by weight.

---

This invention relates to wax emulsions and, in one of its aspects, relates more particularly to oil-in-water emulsions which are primarily paraffinic in nature and of particular utility when employed as coatings and waterproofing agents in a wide variety of industrial applications.

In the manufacture of various forms of structural material, such as, for example, fibrous, cellulosic structural boards, it is customary to incorporate in such material water-resistant agents, for example, in the form of wax emulsions, for the purpose of preventing dimensional changes on exposure to changes in ambient humidity, and to prevent deterioration by contact with liquid water so that useful commercial articles may be produced. A conventional form of applying such wax emulsions to structural articles such as fiberboard or hardboard is to spray these wax emulsions onto the individual fibers or particles prior to forming a mat. It is therefore obvious, from a standpoint of economic desirability, that the highest degree of atomization should be obtained in order to realize the greatest coverage of the surface of the individual fibers or particles with the minimum amount of wax.

The commercially available wax emulsions heretofore employed have been found to be of limited value in such spray applications in which they are prone to form aggregates of wax particles which tend to lodge in the spray atomization nozzles and to render them either completely ineffective or to reduce the atomization efficiency. While the exact mechanism of such wax aggregate formation is not understood, this phenomenon is, nevertheless, well known to those skilled in this art. Heretofore, various mechanical devices have been employed to alleviate this problem of spray nozzle blocking. Such devices have generally comprised screens and the use of manually operated plungers for removing obstructing materials from spray nozzles. While such devices have been found to be effective in varying degrees, they nevertheless require constant attention and frequent periodic cleaning in order to assure that the wax emulsion is being continuously and uniformly applied. It has also been found that in such operations it is common for the protective screens to become completely blocked with the wax agglomerates, so as to prohibit any deposition of wax emulsions onto the fibers or particles. Structural materials produced under these conditions have not been found to meet established specifications for water resistance, and result in marked economic loss.

Other methods have been resorted to for improving the mechanical shear stability of wax emulsions to prevent spray nozzle clogging. These methods, which have heretofore been only partially successful, have included dilution of the wax emulsion with additional water. Such practice has been found to reduce to some degree the formation of wax agglomerates. However, the degree of dilution is markedly limited inasmuch as the additional water has usually been found to be detrimental to the formation of a uniform mat and to the ability for quickly curing thermosetting resins employed as binders. Another method employed for improving mechanical shear stability and preventing spray nozzle clogging is the dilution of the wax emulsion with the emulsions of thermosetting resins used as binders. Such practice is applicable and restricted to specific combinations of the two emulsions inasmuch as these emulsifier systems are usually incompatible and result in an aggravated formation of wax aggregates due to the chemical breakdown of the wax emulsion system.

Another method resides in the use of excessive amounts of emulsifying agents. Such practice, however, is not attractive from an economic standpoint inasmuch as conventionally available emulsifying agents are far more expensive than the waxes employed. In addition, most commercially available emulsifiers are water-soluble, and their incorporation in structural board materials tends to nullify the beneficial water-resistant properties sought to be realized from the use of the wax.

Still another method sought to be employed for improving the aforementioned mechanical shear stability of wax emulsions and to prevent spray nozzle clogging is the plasticizing of the wax or solids phase of the emulsion. It is found that the inclusion of oils, petrolatum, relatively soft microwaxes and other soft oleaginous materials will soften the wax phase of the emulsion so that any agglomerates formed and lodged in restriction of the apparatus are usually deformed and swept out by the pressurized fluid in the spray lines. Such softening agents, however, have been found to possess an inherently inferior water resistance compared to paraffin wax, and the inclusion of such agents results in the degradation of the water resistance sought.

With the above in view, it is known to those skilled in the art that the hydrophobicity or water repellency of waxes is directly related to the normal paraffinic hydrocarbons present in the wax. The presence of iso-paraffinic, cyclo-paraffinic or alkyl aromatic hydrocarbons is found to reduce the water repellency of waxes. Thus, highly refined waxes containing mostly normal or straight-chain paraffins are preferred for obtaining a relatively high degree of water-repellency. It is also found that such highly refined, predominantly normal paraffinic waves are also hard and brittle. In this respect it is known that highly paraffinic hydrocarbons are more difficult to emulsify into oil-in-water emulsions than the branched-chain or cyclic hydrocarbons. In addition, oil-in-water emulsion hydrocarbons, which are present in a solid state at the time of test, are prone to destruction by shear force created by pumping, mixing and agitation. Such sensitivity to destruction by mechanical movement has been found to be related to the composition of the hydrocarbon phase, and emulsions of the higher molecular weight, highly paraffinic hydrocarbons possess the lowest resistance to destruction by mechanical action.

It is, therefore, an object of the present invention to provide oil-in-water wax emulsions which possess a relatively high resistance to mechanical shear.

Another object of the invention is to provide oil-in-water wax emulsions which are predominantly paraffinic in nature and which make possible the realization of good water resistance with relatively small amounts of wax.

Still another object of the invention is to provide stable oil-in-water emulsions comprising paraffin waxes which are highly stable and can be employed in the manufacture of various forms of structural board material in which individual particles can be coated effectively with such emulsions.

A still further object of the invention is to provide a method for preparing the above-described oil-in-water emulsions economically and efficiently.

Other objects and advantages inherent in the invention will become apparent to those skilled in the art from the following detailed disclosure.

In accordance with the present invention, it has now been found that relatively high resistance to mechanical shear can be imparted to oil-in-water emulsions containing paraffin waxes by employing small amounts of methyl cellulose ethers as stabilizing agents. The incorporation of these agents in the emulsion makes possible the achievement of markedly effective water resistance, employing relatively small amounts of wax as a coating material. In this respect, it is also found that these agents can be employed for forming stable oil-in-water emulsions containing normal paraffin waxes, which are not degraded by mechanical action and which can be subjected to extensive pumping, mixing, agitation and movement under relatively high pressures through restrictions, without resulting in the formation of wax agglomerates. It has also been found that the aforementioned methyl cellulose ethers employed as stabilizing agents, as heretofore indicated, can result in wax emulsions which are chemically compatible with conventionally employed urea-formaldehyde or phenol-formaldehyde resin binder emulsions and, in this respect, exhibit a degree of compatibility which is not achieved by other known oil-in-water wax emulsions.

In employing the aforementioned methyl cellulose ethers as stabilizing agents in accordance with the present invention, it is found that these agents are also capable of reacting with conventionally employed thermosetting resin binders, and become part of the infusible, insoluble resin upon subsequent curing. This results in removing a water-soluble material from the finished article, and further enhances the water resistance of such materials as bonded structural board. In employing the aforementioned methyl cellulose ethers as stabilizing agents in oil-in-water emulsions containing normal paraffin waxes, it has also been found that these stabilizing agents possess a unique beneficial property by imparting water resistance to certain highly porous species of wood. Such highly porous woods have been found to be prone to absorb aqueous water emulsions readily, and in the subsequent curing process which is conducted at elevated temperatures, it is found that conventional wax emulsions decrease in viscosity with increasing temperatures. Thus, the hitherto available commercial, conventional wax emulsions are readily absorbed into the wood particles so that they no longer protect the surface of these particles and make it possible for them to pick up moisture upon exposure to relatively high ambient humidity. The methyl cellulose ethers have been found to form solutions which thicken upon being heated and form reversible gels if heated sufficiently. It is theorized that the exceptionally good performance obtained with the oil-in-water wax emulsions of the present invention containing the aforementioned methyl cellulose ethers as stabilizing agents is due, at least in part, to the increase in viscosity of these emulsions upon being heated during the resin curing process, which restricts the penetration of the emulsions into the wood particles so that they remain largely on the surface of the particle, and thus enhance water repellency.

The methyl cellulose ethers employed as stabilizing agents in the oil-in-water wax emulsions of the present invention are commercially available under the trade name "Methocel" (manufactured by The Dow Chemical Co., Midland, Mich.). These "Methocel" products are derived from carbohydrates, and the polymeric backbone of these products is provided by cellulose, a substance which contains a basic repeating structure of condensed glucose units. In preparation, cellulose fibers obtained from cotton linters or wood pulp are swelled by a caustic soda solution to produce alkali cellulose, which is treated with methyl chloride, yielding the methyl ether of cellulose. The resulting fibrous reaction product is purified and ground to a fine, uniform powder. A typical representative type of methyl cellulose ether comprises hydroxypropyl methylcellulose (propylene glycol ether of methylcellulose).

The paraffin wax employed in the novel oil-in-water emulsions of the present invention may comprise any paraffin wax obtained from various sources such as, for example, from petroleum distillation processes. This wax is preferably employed in a form in which normal paraffins predominate, although paraffin waxes entirely devoid of normal paraffins may also be employed. In its preferred form, the paraffin waxes employed have melting points within the range from about 100° F. to about 150° F. In this respect, paraffin waxes having a melting point above about 120° F. are most desirable, thereby avoiding the formation of oily type emulsions and concomitantly minimizing the possibility of bleed-through when painted coatings are applied.

In the above-described novel oil-in-water emulsions of the present invention, the paraffin wax component is generally employed in an amount from about 5 to about 65 percent, and preferably from about 45 to about 65 percent, by weight, of the total weight of the emulsion. In this respect, as previously discussed, the paraffin wax present may consist entirely of normal paraffins or may comprise paraffins wherein from about 70 to about 100 percent, and preferably from about 80 to about 100 percent, by weight, of these paraffins comprise normal paraffins. The methyl cellulose ether present in the novel oil-in-water emulsions of the present invention is generally employed in an amount from about 0.1 to about 5 percent, and preferably from about 0.2 to about 0.75 percent, by weight, of the total weight of the emulsion.

The preparation of the novel oil-in-water emulsions is, in general, carried out by first adding the methyl cellulose ether to a portion of the required amount of water which is maintained at a temperature at which a substantially lump-free aqueous dispersion can be formed. The remaining quantity of the required amount of water, maintained at a reduced temperature, is then added to the aqueous dispersion thus formed to reduce the temperature of the aqueous dispersion and to solubilize the methyl cellulose ether. Thereafter, the resulting solution is heated to a temperature which is higher than the melting point of the paraffin wax. The paraffin wax is then added to the thus-heated solution, and the resulting mixture is then subjected to homogenization to obtain the desired oil-in-water emulsion. In its preferred application, the above-described process can be carried out by first adding the methyl cellulose ether to a portion of the water (e.g., one-fifth to one-third of the required amount of water), maintained at a temperature from about 180° F. to about 200° F., so that after mixing, a substantially lump-free aqueous dispersion is formed. Thereafter, the remaining portion of the water is added, maintained at a reduced temperature, which may be at room temperature or even in the form of ice, whereupon the temperature of the aqueous dispersion is reduced to a temperature which is not higher than about 120° F., and the methyl cellulose ether is solubilized. The resulting solution is then heated to a temperature which is at least 10° F., and preferably at least 20° F. higher than the melting point of the paraffin wax. The paraffin wax is then added to the thus-heated solution, and the resulting mixture is then subjected to homogenization to obtain the desired oil-in-water emulsion.

With respect to the methyl cellulose ethers employed in the novel oil-in-water emulsions of the present invention as stabilizing agents, it is found that solutions of these methyl cellulose ethers are chemically and physically distinct from those of other chemically known water-soluble gums in that they have the ability to gel upon heating, whereas other gums, such as gelatin, will gel only on cooling. This unique property of thermal gelation provides the basis for many commercial applications of the methyl cellulose ether component. Thus, it is found that it permits the formulation of binders and adhesives which, when heated, will set instead of thinning. The basis of the aforementioned gelation phenomenon is believed to reside in the nature of the solution which is a jacketing of the long, thread-like polymer molecule with layers of water molecules which increase the bulk of the aggregate. It is believed that these water molecules act as a lubricant which enables the long cellulose ether chains to slide easily over one another, giving the solution the property of a smooth-pouring, viscous liquid. As the temperature increases, the viscosity is initially lowered and the energy of these more or less loosely-bound water molecules is increased, and the outer layers of water molecules break away. When enough of the attached water molecules are driven from the cellulose ether chains, the lubricating action is lost, the chains lock and the solution is transformed into a gel. Methyl cellulose ethers are commercially available in a series which have increasing thermal gel temperatures. An increase in temperature beyond the thermal gel point drives off more water, producing a change in gel texture. The gelation phenomenon is reversible on cooling. It will therefore become apparent that the presence of the methyl cellulose ether in the novel oil-in-water emulsions of the present invention is of extreme importance as a stabilizing agent.

The following examples will serve to illustrate the novel oil-in-water emulsions of the present invention, their method of preparation and their comparative superiority and efficacy when employed for use in various industrial applications.

Example 1

An oil-in-water emulsion was prepared having the following formulation:

| Emulsion A: | Weight percent |
|---|---|
| Paraffin wax (125° F. ASTM M.P.)[1] | 42.6 |
| Hydroxypropyl methylcellulose | 0.5 |
| Corrosion inhibitor (NaNO$_2$) | 0.2 |
| Water | 56.7 |
| | 100.0 |

[1] Contained 85%, by weight, of normal paraffins.

The above-described oil-in-water emulsion was prepared by first dispersing the hydroxypropyl methylcellulose in 20 percent, by weight, of the water maintained at a temperature between about 180° F. to about 200° F. After a substantially lump-free aqueous dispersion had been obtained by stirring, the balance of the water was added at ambient temperature to the dispersion, thereby bringing the temperature down to about 120° F. and solubilizing the hydroxypropyl methylcellulose. After the hydroxypropyl methylcellulose had been completely solubilized (as evidenced by the attainment of a clear solution), it was heated to a temperature from about 140° F. to about 145° F. The corrosion inhibitor was then added. The paraffin wax was next added at the same temperature. A rough predispersion was made employing a high speed mixer and passed through a two-stage homogenizer twice at 3,000 p.s.i.g.

Example 2

Another oil-in-water emulsion was prepared having the following formulation:

| Emulsion B: | Weight percent |
|---|---|
| Paraffin wax (125° F. ASTM M.P.)[1] | 42.6 |
| Natural gum stabilizer | 0.50 |
| Lignin emulsifier | 3.75 |
| Bactericide (Formalin) | 0.2 |
| Corrosion inhibitor (NaNO$_2$) | 0.2 |
| Water | 52.75 |
| | 100.00 |

[1] Contained 85%, by weight, of normal paraffins.

The above-described oil-in-water emulsion was prepared by first dispersing the gum stabilizer and the lignin emulsifier in the water maintained at a temperature between about 160° F. to about 180° F. The paraffin wax was next added at the same temperature. Thereafter, the bactericide and corrosion inhibitor were added. A rough predispersion was made employing a high speed mixer and passed through a two-stage homogenizer twice at 3,000 p.s.i.g.

For comparative purposes, emulsions A and B were individually employed for producing particleboard, using, by weight, based on oven-dry wood-flakes, 8 percent urea-formaldehyde resin solids, as a binder; and 1.0 percent of the respective emulsion solids, each sprayed on aspen wood-flakes. The aspen wood-flakes were separately sprayed with the respective emulsion and with the resin binder. The thus-produced mixtures were formed into mats, and the latter were then individually pressed at a temperature of 300° F. for a press-cycle of 12 minutes, and structural bonded particleboards of ¾" thickness were produced having densities ranging from 32.8 lbs. per cubic foot to 46.7 lbs. per cubic foot and a wax emulsion solids content of about 1 percent, by weight.

The respective boards thus produced were then subjected to a water absorption performance test. In this test, the boards were individually, horizontally immersed in water maintained at 70° F. with a one-inch head of water over the top surface of the board, and maintained in this position for a period of 24 hours. The respective amounts of water found to be absorbed in each instance were treated by regression analysis and compared at a common density of 42 lbs. per cubic foot. The results are shown below.

| | Water absorption in 24 hours (wt. percent) |
|---|---|
| Board with Emulsion A | 44.1 |
| Board with Emulsion B | 60.0 |

From the foregoing examples and comparative data, it will be apparent that a marked superiority in water resistance is achieved in structural materials in which the oil-in-water emulsions of the present invention containing methyl cellulose ethers as stabilizers are employed, as compared with the same structural material employing the same oil-in-water emulsion in its fabrication, but in which the methyl cellulose ether stabilizer is replaced by a conventional type stabilizer.

While the foregoing examples and data have illustrated the efficacy of the methyl cellulose ethers as stabilizers in the novel oil-in-water emulsions of the present invention, as illustrated by the use of hydroxypropyl methylcellulose, other methyl cellulose ethers may also be effectively employed for this purpose, and these may therefore include carboxy methylcellulose, and other alkyl-substituted cellulose ethers of alkylene glycols or oxides. Although the present invention has been described herein by means of

We claim:

1. An oil-in-water emulsion comprising an essentially normal paraffin wax, having a melting point within the range from about 100° F. to about 150° F., in an amount from about 5 to about 65 percent, by weight, and a hydroxyalkyl methylcellulose ether stabilizer in an amount from about 0.2 to about 0.75 percent, by weight.

2. The emulsion of claim 1 wherein said paraffin wax is present in an amount from about 45 to about 65 percent, by weight.

3. The emulsion of claim 1 wherein said paraffin wax comprises from about 70 to about 100 percent, by weight, of normal paraffins, based on the total amount of wax present.

4. The emulsion of claim 1 wherein said paraffin wax comprises from about 80 to about 100 percent, by weight, of normal paraffins, based on the total amount of wax present.

5. The emulsion of claim 1 wherein said methyl cellulose ether comprises hydroxypropyl methylcellulose.

References Cited

UNITED STATES PATENTS

| | | | |
|---|---|---|---|
| 2,245,499 | 6/1941 | Reichel et al. | 106—170 |
| 2,567,722 | 9/1951 | Marberg et al. | 106—170 |
| 2,737,458 | 3/1956 | Burnham | 106—170 |
| 2,835,641 | 5/1958 | Widmer et al. | 117—135.5 |
| 3,303,150 | 2/1967 | Coenen et al. | 117—148 |

FOREIGN PATENTS

| | | |
|---|---|---|
| 621,188 | 4/1959 | Great Britain. |

ALLAN LIEBERMAN, *Primary Examiner.*

U.S. Cl. X.R.

106—191, 271; 117—135.5, 148, 157

UNITED STATES PATENT OFFICE
CERTIFICATE OF CORRECTION

Patent No. 3,432,319                                    March 11, 1969

Eugene A. Jakaitis et al.

It is certified that error appears in the above identified patent and that said Letters Patent are hereby corrected as shown below:

In the heading to the printed specification, line 5, "Emilio A. Roblendano" should read -- Emilio A. Robledano --. Column 2, line 55, "waves" should read -- waxes --.

Signed and sealed this 31st day of March 1970.

(SEAL)
Attest:

Edward M. Fletcher, Jr.                          WILLIAM E. SCHUYLER, JR.
Attesting Officer                                       Commissioner of Patents